United States Patent
Mokbel et al.

[11] Patent Number: 5,905,969
[45] Date of Patent: May 18, 1999

[54] PROCESS AND SYSTEM OF ADAPTIVE FILTERING BY BLIND EQUALIZATION OF A DIGITAL TELEPHONE SIGNAL AND THEIR APPLICATIONS

[75] Inventors: Chafic Mokbel; Denis Jouvet, both of Lannion; Jean Monne, Ploumanach, all of France

[73] Assignee: France Telecom, Paris, France

[21] Appl. No.: 08/501,672

[22] Filed: Jul. 12, 1995

[30] Foreign Application Priority Data

Jul. 13, 1994 [FR] France ................................. 94 08741

[51] Int. Cl.$^6$ ........................................................ G10L 3/02
[52] U.S. Cl. .............................................. 704/203; 704/201
[58] Field of Search ....................... 395/2.09, 2.1, 395/2.2, 2.21, 2.28, 2.35, 2.36, 2.37, 2.39; 375/229–233

[56] References Cited

U.S. PATENT DOCUMENTS

| | | | |
|---|---|---|---|
| 4,184,129 | 1/1980 | Macchi Nee Danjon et al. | 333/18 |
| 4,227,046 | 10/1980 | Nakajima et al. | 395/2.36 |
| 4,283,601 | 8/1981 | Nakajima et al. | 395/2.36 |
| 4,319,082 | 3/1982 | Gilloire et al. | 395/2.2 |
| 5,012,519 | 4/1991 | Adlersberg et al. | 395/2.35 |
| 5,226,085 | 7/1993 | Di Francesco | 395/2.28 |
| 5,248,845 | 9/1993 | Massie et al. | 84/622 |
| 5,263,033 | 11/1993 | Seshadri | 375/43 |
| 5,271,088 | 12/1993 | Bahler | 395/2.09 |
| 5,283,813 | 2/1994 | Shalvi et al. | 375/12 |
| 5,347,541 | 9/1994 | Iltis et al. | 375/12 |
| 5,432,818 | 7/1995 | Lou | 375/324 |
| 5,432,859 | 7/1995 | Yang et al. | 395/2.28 |
| 5,524,148 | 6/1996 | Allen et al. | 395/2.34 |
| 5,583,963 | 12/1996 | Lozach | 395/2.28 |
| 5,706,402 | 1/1998 | Bell | 395/23 |

FOREIGN PATENT DOCUMENTS

| | | | |
|---|---|---|---|
| 3431141 | 6/1986 | Germany | H04B 3/20 |

OTHER PUBLICATIONS

IEEE SP Magazine, Jan. 1992, pp. 15–37, "Frequency Domain and Multirate Adaptive Filtering", John Shynk.

On line Adaptation of a Speech Recognizer to Variations in Telephone Line Conditions, Mokbel et al, pp. 1247–1250.

"Adaptive Noise Cancelling: Principles and Applications", widrow et al, Proceedings of the IEEE, Vo. 63, No. 12, Dec. 1975.

"An Acoustic Canceller Using Subband Sampling and Decorrelation Methods", Yasukawa et al, IEEE Transactions on Signal Processing, vol. 41, No. 2, Feb. 1993.

Autoregressive Spectral Estimation in Noise with References to speech Analysis, Robert Preuss, Digital Signal Processing, Apr. 1991.

"Blind Equalizers", Benveniste et al, IEEE Transactions on Communications, vol. Com–32, #8, Aug. 1994.

*Primary Examiner*—David R. Hudspeth
*Assistant Examiner*—Michael N. Opsasnick
*Attorney, Agent, or Firm*—Larson & Taylor

[57] ABSTRACT

A process and a system for adaptive filtering of a digital telephone signal, in which the digital telephone signal is submitted to a frequency transformation and to a sub-band filtering in order to produce a plurality of sub-band signals. Each of the sub-band signals is submitted in turn to an adaptive filtering starting from a reference signal based on a long-term statistics regarding the telephone signal, equalization by blind deconvolution of the effects of the telephone transmission lines on the digital telephone signal thus being obtained.

11 Claims, 3 Drawing Sheets

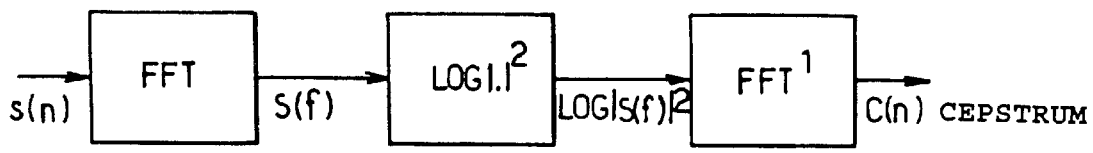
FIG. 1a. PRINCIPLE OF CALCULATING THE CEPSTRUM (PRIOR ART)
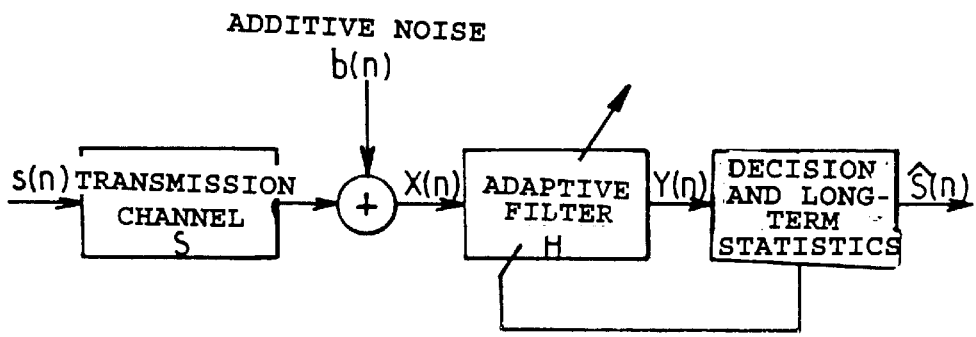
FIG. 1b. GENERAL PRINCIPLE OF A SELF-TEACHING (BLIND) EQUALIZER USED IN DIGITAL TRANSMISSION (PRIOR ART)

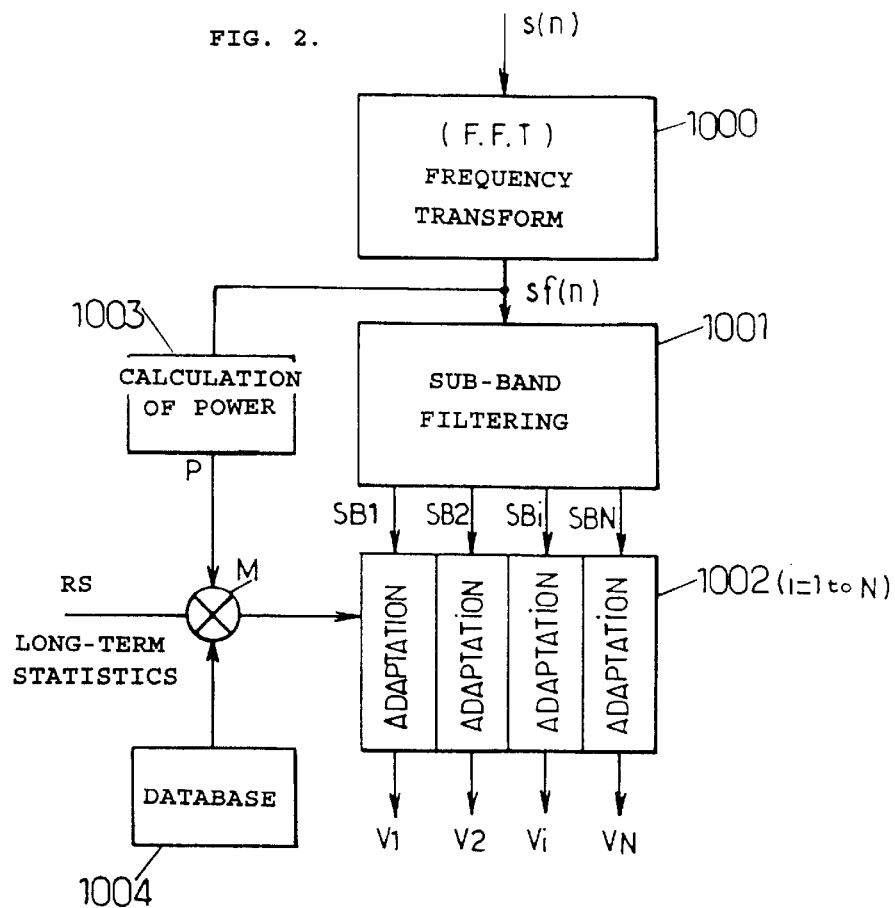
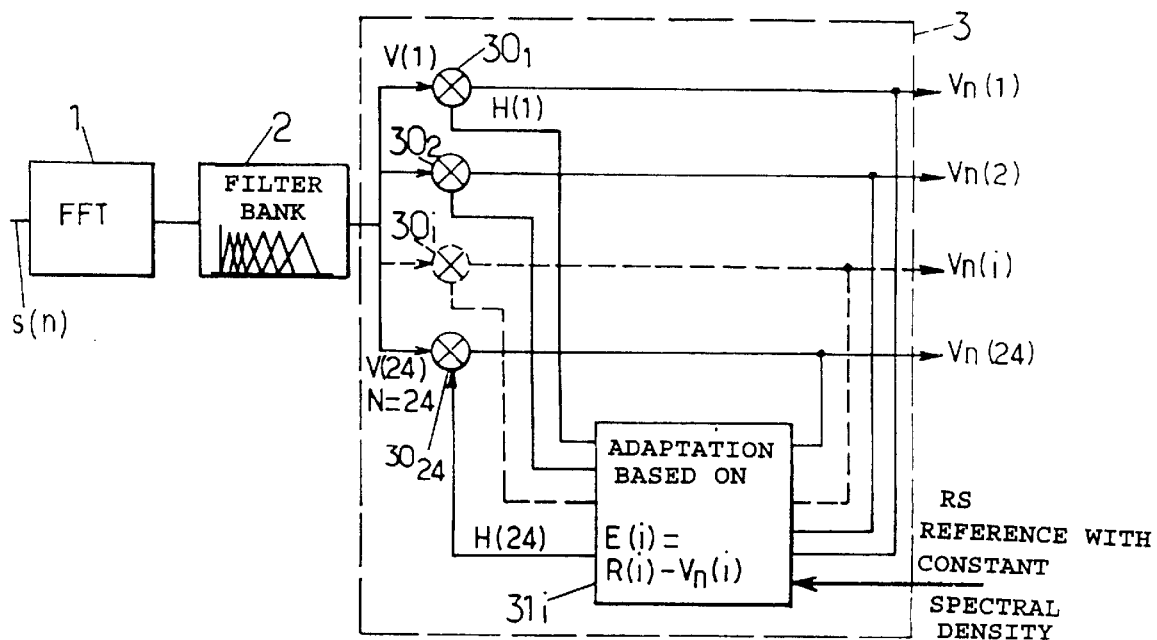
FIG. 3a. BLIND EQUALIZATION OF THE EFFECTS OF THE TELEPHONE LINES

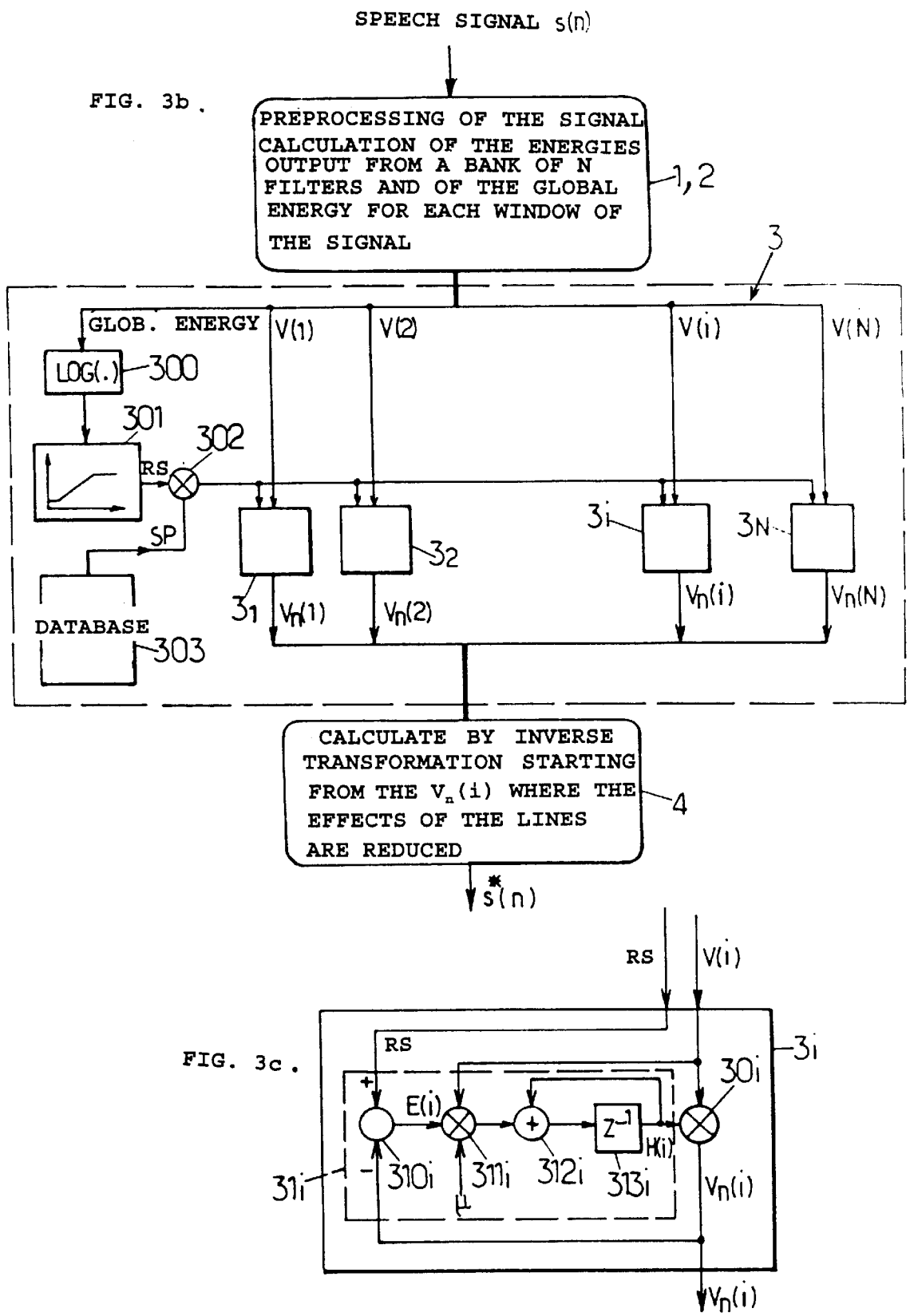

PROCESS AND SYSTEM OF ADAPTIVE FILTERING BY BLIND EQUALIZATION OF A DIGITAL TELEPHONE SIGNAL AND THEIR APPLICATIONS

The invention relates to a process and a system of adaptive filtering by blind equalization of a digital telephone signal and their application to telephone transmission and/or the automatic recognition of speech.

In automatic speech recognition systems, the main difficulty of effective recognition is due to the variations which appear in the digital acoustic signal which carries the speech. The sources of variation are numerous and it is usual to distinguish between variability intrinsic and variability extrinsic to the speaker. Indeed, the acoustic manifestations or materializations of a given word differ, for example, according to the state of the speaker or the context of the word in the sentence. This difference is further accentuated if the acoustic manifestations originating from several speakers are compared.

The acoustic manifestations of words are acoustic waves, pressure waves, which have to be picked up in order to be recognized. During acquisition of a speech wave by means of a microphone, various disturbances get added to it, thereby increasing the variability of the signal thus produced. Ambient noise is also an acoustic wave, picked up by the microphone and mixed additively with the initial speech wave.

Furthermore, in the case, especially, of applications of speech recognition across the telephone network, the acquisition module formed by the microphone of the telephone handset and by the telephone lines linking the user to the recognition system act as a linear convolution filter which varies slowly over time.

In respect of a telephone handset of conventional type, not operating in hands-free mode, the effects of ambient noise are negligible, but the convolutive effects of the transmission lines are predominant. Thus, each signal observed at the input of the automatic speech recognition system contains a convolutive component, which is substantially constant for a given call, but is liable to vary from one call to another.

This convolutive component is deleterious to speech recognition. A representation of this component in cepstral space shows that a convolutive filter, which represents the transmission channel, is transformed into a bias (almost constant continuous component) which is added to the cepstral vectors. This bias changes from one call to another. With reference to FIG. 1a, it is recalled that the cepstral vectors, in a cepstral representation, are obtained in the manner below, the digital speech signal s(n) being transformed into a string of vectors whose parameters are calculated over windows generally of fixed length (10 to 40 ms) which overlap by:

calculation of the spectrum of the signal over each window by fast Fourier transform, FFT, type frequency transform, calculation of the logarithm of the spectral energy, calculation of the cepstral vector, formed of cepstral coefficients, by inverse frequency transform $FFT^{-1}$ of the logarithm of the spectral energy. The cepstral coefficients make it possible to represent the impulse response of the voice channel and therefore bear the information pertinent to speech recognition. Moreover, these coefficients are insensitive to the energy of the input signal, this making it possible consequently to reduce the variability in the signal submitted for recognition.

Given this bias, the continuous component, the cepstral vectors, corresponding to a unique acoustic reality, occupy however a wider domain of the cepstral representation space, and this, of course, has the effect of diminishing the discriminating power of these vectors and entails the implementation of complex models capable of allowing effective discrimination between the various forms of the vocabulary of the relevant application. For a more detailed description of the problem posed, it will be profitable to refer to the article published by C. Mokbel, J. Monné and D. JOUVET, entitled "*On-line Adaptation of a Speech Recognizer to Variations in Telephone Line Conditions*"; EUROSPEECH pp. 1247–1250, Berlin 1993.

Given the above account, it would appear to be necessary to reduce as far as possible the effects of telephone lines on an observed signal, so as to improve the recognition performance, for a given system.

The problem posed is a problem of blind deconvolution since, unlike the known problems of acoustic echo cancellation, dereverberation and/or antenna filtering, in which cases several pick-ups conveying a larger amount of information are available, a single microphone pick-up is available in the present case. Although the solution to the problem posed may therefore be reduced to a deconvolution procedure, the speech signal, or digital telephone signal, and the transfer function of the channel occupy the same frequency regions and exhibit a common domain in cepstral space, and it is therefore very difficult to define filters or "lifters", performing a weighting or filtering in cepstral space, making it possible to carry out the sought-after deconvolution procedure.

The currently known technical solutions to the aforesaid problem have hitherto had the object, either of improving the robustness of automatic speech recognition procedures to the conditions of acquisition of the telephone signal, or the reduction of the disturbances in a telephone signal, so as to improve the latter's intelligibility.

In automatic speech recognition systems, when recognition is performed locally for the voice control of hands-free telephones of computers or the like, the techniques, aimed at reducing the disturbances introduced by additive noise, embrace filtering by spectral subtraction, antenna filtering, Markov model state filtering, or the on-line addition of ambient noise to the signal and reference models.

In respect of centralized recognition, the techniques also have the objective of reducing the effects of the telephone lines, by subtracting from the cepstral vectors their continuous component estimated over a sufficiently broad horizon. It is recalled that the notion of horizon designates, for a digital telephone signal subdivided into windows, a specified whole number of successive windows. For a more detailed description of this type of approach, it will be profitable to refer to the article cited earlier. For a fairly broad horizon, it is found that the mean of the cepstral vectors represents the effects of the telephone lines, this finding being confirmed all the more when the changes in the characteristics of the channel are slow.

For a general deconvolution procedure, two major types of deconvolution are implemented, blind deconvolution, based on spectral or cepstral or else temporal properties of the signal submitted for deconvolution. In the telecommunications sector, adaptive equalization algorithms are akin to a procedure of blind deconvolution (c.f. for example the article by A. BENVENISTE and M. GOURSAT "*Blind Equalizers*", "IEEE TRANSACTIONS ON COMMUNICATIONS", Vol. COM-32, No. 8, August 1984, pp. 871–833, 1984). The second type of deconvolution, used for example in echo cancellation or dereverberation algorithms, implements adaptive filtering, or spatial filtering in the case of acoustic antennas. For a more detailed description of this type of processing, it will be profitable to refer to the article entitled *"Adaptive Noise Cancelling: Principles and Applications"*, PROCEEDINGS OF THE IEEE, Vol. 63, No. 12, Dec. 1975, pp. 1692–1716, 1975, published by B. WIDROW et al.

Finally, in the sector of digital signal transmissions, the problems posed by the equalization procedure are similar by virtue of the fact that it is difficult to obtain an actual reference so as to use a conventional adaptive filtering scheme, in order to cancel the effect of the transmission channel, since the only signal available is the observed digital signal already transmitted. To make the task easier, digital sequences known to the receiver can certainly be sent, so as to identify the transfer function of the transmission channel. However, such a procedure rapidly saturates the transmission capacity of the channel. In order to remedy the aforesaid drawback, a number of studies aimed at defining a blind equalization scheme have been performed. The solution adopted consists in using decision logic and known long-term statistics regarding the digital signal transmitted, in order to calculate the error serving in the adaptation of the coefficients of a stochastic gradient descent adaptive filter, as illustrated diagrammatically in FIG. 1$b$. For a more detailed description of this type of processing, reference may be made to the article entitled *"Frequency-Domain and Multirate Adaptive Filtering"*, IEEE Signal Processing Magazine, pp. 15–37, Jan. 1992, published by J. J. SHYNK.

The aim of the present invention is to remedy the drawbacks of the aforesaid prior methods, through the implementation of a process and a system of adaptive filtering by blind equalization of a digital telephone signal, more particularly intended for automatic speech recognition applications, across the switched telephone network.

The process of adaptive filtering of a digital telephone signal, which is the subject of the present invention, is noteworthy in that it consists in submitting the digital telephone signal to a frequency transformation, of FFT type, and to a sub-band filtering in order to produce a plurality of sub-band signals. Each of the sub-band signals is submitted to an adaptive filtering starting from a reference signal based on long-term statistics regarding the telephone signal, this making it possible to perform equalization by blind deconvolution of the effects of the telephone transmission lines on the digital telephone signal.

System for adaptive filtering of a digital telephone signal, which is the subject of the present invention, is noteworthy in that it includes a circuit for frequency transformation by FFT processing and a circuit for sub-band filtering in order to produce a plurality of sub-band signals, starting from the digital telephone signal. A circuit for generating a reference signal makes it possible to produce a reference signal based on long-term statistics regarding the telephone signal, and a circuit for adaptive filtering of each of the sub-band signals starting from the reference signal, makes it possible to produce filtered sub-band signals, this making it possible to perform equalization by blind deconvolution of the effects of the telephone transmission lines on the digital telephone signal.

The process and the system of adaptive filtering by blind equalization of a digital telephone signal, which are the subjects of the present invention, find application to the improving of automatic speech recognition procedures and/ or the quality of restitution, after transmission, of digital telephone signals.

They will be better understood on reading the description and studying the drawings below, in which, apart from FIGS. 1$a$ and 1$b$ relating to the prior art, FIG. 2 represents, in block diagram form, a flow chart for a process of adaptive filtering by blind equalization of a digital telephone signal and their applications, FIG. 3$a$ represents a functional diagram of the device for adaptive filtering by blind equalization of a digital telephone signal, which is the subject of the present invention, FIG. 3$b$ represents an embodiment detail of the device of FIG. 3$a$, in a particular non-limiting embodiment, FIG. 3$c$ represents an embodiment detail of the device represented in FIG. 3$b$.

A more detailed description of the process of adaptive filtering of a digital telephone signal, which is the subject of the present invention, will now be given in conjunction with FIG. 2.

Generally, it is indicated that the digital telephone signal transmitted, denoted s(n), is formed by a string of digitally coded samples.

According to a particularly advantageous aspect of the process, which is the subject of the present invention, the latter consists in submitting the digital signal s(n) to a frequency transformation of Fourier transform type, and in particular of fast Fourier transform type FFT, in a step denoted 1000 in the aforesaid FIG. 2. Generally, it is indicated that the frequency transformation is performed starting from the aforesaid digital samples, these samples being grouped together into windows of successive samples, these windows including a specified number of samples and two successive windows effecting an overlap over one or more common samples. Procedures for processing by frequency transformation are known procedures as are the procedures for processing by fast Fourier transform and, in this respect, the latter will not be described in detail.

According to another aspect of the process, which is the subject of the present invention, the latter consists, in a step 1001, in submitting the digital signal transformed by the aforesaid frequency transformation, this transformed signal being denoted sf(n), to a sub-band filtering procedure, denoted 1001 in FIG. 2, in order to produce a plurality of sub-band signals, these signals being denoted $SB_1$, $SB_2$, . . . $SB_i$ to $SB_N$. In a conventional manner, it is understood that the sub-band filtering makes it possible starting from the transformed digital signal sf(n) to obtain, for each of the sub-band signals, frequency components in each sub-band of specified value. By sub-band of specified value is understood a frequency sub-band exhibiting a centre frequency and a specified bandwidth. It is understood that the sub-band filtering can be carried out so as to distribute the transformed signal sf(n) into substantially adjacent bands which may exhibit a certain overlap of frequencies.

Subsequent to the sub-band filtering processing, denoted 1001 in FIG. 2, in accordance with a particularly advantageous aspect of the process, which is the subject of the present invention, each of the sub-band signals $SB_1$, $SB_i$ to $SB_N$ is then submitted to a corresponding adaptive filtering, denoted $1002_1$ to $1002_N$, starting from a reference signal RS based on long-term statistics regarding the transmitted telephone signal.

It is indicated that such an operating mode makes it possible to perform equalization by blind deconvolution of the effects of the telephone transmission lines on the digital telephone signal s(n).

According to another particularly advantageous aspect of the process of adaptive filtering, which is the subject of the present invention, it is indicated that the latter moreover consists in submitting the reference signal RS to a modulation, in step 1003, of the power P modulation type, depending on the power of the digital telephone signal received s(n). In general, it is indicated that the calculation of the power of the digital telephone signal s(n) can advantageously be performed, as will be described in more detail later in the description, starting from the transformed signal sf(n) as represented illustratively in FIG. 2. The power modulation of the reference signal can then be performed by way of a modulation M, as represented in the aforesaid FIG. 2.

Generally, it is indicated that the reference signal RS can be a signal with constant spectral density and that moreover this signal can be modulated in a step 1004 by a digital signal produced by a database specific to the type of communications carried by the digital telephone signal. Of course, the modulation can be performed in the modulation step M mentioned earlier in conjunction with FIG. 2.

A more detailed description of a system of adaptive filtering of a digital telephone signal in accordance with the subject of the present invention, making possible especially the implementation of the filtering process such as described earlier in conjunction with FIG. 2, will now be given in conjunction with FIG. 3a.

According to the aforesaid figure, it is indicated that the system, which is the subject of the present invention, includes a circuit 1 for frequency transformation by FFT processing cited earlier, and a circuit 2 for sub-band filtering in order to produce a plurality of sub-band signals starting from the digital telephone signal s(n), as described earlier in the description. Generally, it is indicated that the circuit for processing by fast Fourier transform FFT is a circuit of conventional type, of butterfly type, for example, making it possible to carry out the processing over the weighting windows of the input signal s(n).

As regards the sub-band filtering circuit 2, it is indicated that the latter can be embodied through a bank of filters whose transfer functions with respect to the centre frequency and in particular whose bandwidth with respect to this centre frequency, makes it possible to perform a certain overlapping of the aforesaid frequency bands. The conventional techniques for calculating filters can be used to embody the bank of filters constituting the sub-band filtering circuit 2 such as represented in FIG. 3a.

Conventionally, it is indicated that each filter bank delivers a signal of digital type, these signals, designated as elementary signals, being referenced V(1) to V(N) where N denotes the number of sub-bands and hence of banks of filters making up the sub-band filtering circuit 2.

In a practical embodiment, it is indicated that the number N of sub-bands and hence the number of elementary signals has been taken equal to N=24.

At the output of the sub-band filtering circuit 2, the system, which is the subject of the present invention, comprises a circuit 3 for adaptive filtering of each of the sub-band signals V(1), . . . V(i), . . . V(N). The adaptive filtering is carried out starting from the reference signal RS. The adaptive filtering circuit 3 includes, for each of the elementary signals, an adaptive filtering path embodied as follows.

A multiplier circuit (attenuator) 30$_i$ receives on a first input one of the elementary signals V(i) and, on another input, an adaptation value H(i), that is to say a weighting value, denoted H(1) to H(N). The output of each multiplier element, 30$_i$, delivers a filtered elementary signal, denoted $V_n(1)$ to $V_n(i)$, $V_n(N)$. The output of each multiplier element 30$_i$ cited earlier is looped back to the second input receiving the attenuation or filtering parameter H(i) by way of an adaptation module, denoted 31$_i$, a single adaptation module being represented in FIG. 3a so as not to overload the drawing. It is nevertheless understood that each adaptation module 31$_i$ carries out adaptation based on an error criterion, a corresponding error for the elementary signal of rank i being defined by the relation:

$$\text{Err}(i)=R(i)-V_n(i).$$

In the aforesaid relation, it is indicated that the expression R(i) designates the reference signal for the corresponding elementary signal V(i).

A justification of the operating mode of the process, which is the subject of the present invention, as represented in FIG. 2 and of the filtering system such as represented in FIG. 3a, will now be given below in the description.

In the application of the process and of the device, which are the subjects of the present invention, to the automatic recognition of speech across the telephone network, one microphone alone, that of the telephone handset, is of course available.

The blind equalization algorithm, based on the error criterion mentioned earlier, makes it possible to implement an adaptive filtering scheme in order to reduce, or equalize, the effects of the telephone lines in a speech signal observed at the input of a centralized recognition system. The operating mode of the adaptation modules, such as the modules 31$_i$ in FIG. 3a, consists in carrying out an adaptation of the parameters of a filter of LMS type, standing for "least mean square", so as to calculate the error serving in the adaptation of the coefficients of a stochastic gradient descent adaptive filter. It is of course understood that the adaptive filter is embodied by the set of multiplier or attenuator elements 30$_i$ which are continuously driven by each adaptation element, or adaptation module, 31$_i$.

The filtering thus effected is therefore performed while observing a single input, the digital telephone signal s(n).

As prior theoretical studies have shown, the long-term spectrum of a speech signal is substantially flat, that is to say it is substantially constant over all frequencies. Theoretical studies have also shown that the mean of the logarithms of the spectral densities over a sufficiently broad horizon exhibits a constant convolutive component in the observed signal, which component can be likened to the contribution of the transmission channel.

Thus, the association of a reference signal RS consisting of a signal with constant spectral density, the reference signal constituting the reference for the LMS type filtering by virtue of a small and suitable gradient increment, makes it possible to identify and compensate for the contribution of the transmission channel.

The adaptive filtering, of LMS filtering type, is set up in the spectral domain and applied to the energies output from the filter bank making up the sub-band filtering circuit 2.

On looking at FIG. 3a, it may be observed that:

the equalization is then based on the fact that the long-term spectral density of the telephone signal is fixed and almost flat, the adaptive filtering is applied directly in the spectral domain, that is to say blockwise filtering and adaptation of the parameters of the adaptive filter, that is to say of the attenuation elements 30$_i$ at the conclusion of each signal window.

Such a setup is generally known by the name "circular convolution method". Such a method is not optimal in the sense that it sets up a circular convolution in a time domain.

Nevertheless, it appears to be less expensive in calculation time than the optimal methods of frequency or sub-band filtering. Moreover, it is indicated that this type of filtering does not take into account the phase of the speech signal, such a parameter not being used in the area of automatic speech recognition.

The equations for adapting the parameters of the optimal filter can then be established in the manner below.

Assuming that the digital telephone signal s(n) is the convolution of an actual emitted speech signal x(n) and a filter representing and identifying the telephone channel w(n), it is possible to write:

$$s(n)=x(n)*w(n) \qquad (1)$$

In the aforesaid relation, the sign * represents the convolution operator.

With a view to generalization, the various equations below are developed in spectral space, the space of filtered bands used in conjunction with FIG. 3a being a particular case.

By expressing the spectral power densities of the two terms in the aforesaid relation (1), we obtain for each window of the speech signal:

$$S_s(f)=S_x(f)W^2(f) \qquad (2)$$

In the aforesaid relation, it is indicated that $S_s(f)$ and $S_x(f)$ represent the power spectral densities of s(n) and x(n) respectively, W(f) representing the transfer function of the telephone channel in frequency space under the operator FFT[w(n)].

The adaptive filter with transfer function H(f) is applied directly to the power spectral density of s(n), expressed in the form $S_s(f)$, in order to produce the normalized spectrum $S_n(f)$ expressed in the form:

$$S_n(f)=S_s(f)H(f)=S_x(f)W^2(f)H(f). \qquad (3)$$

The reference signal RS exhibiting a constant spectrum, of the form R(f), the error Err(f) for each window of the digital telephone signal then being written:

$$Err(f)=R(f)-S_x(f)W^2(f)H(f) \qquad (4)$$

The optimal filter towards which the adaptive filter H(f) converges is the filter which minimizes the mean square error in each of the frequency bands of each sub-band f. The mean square error as a function of frequency is expressed in the form:

$$EQM(f)=E[Err^2(f)]. \qquad (5)$$

In the aforesaid relation, it is indicated that the expression $E[Err^2(f)]$ indicates the mathematical expectation of the square of the error Err(f) cited earlier.

Employing the assumption of a constant long-term speech spectrum and of a transfer function W(f) which is constant over a broad horizon, the optimal filter is then the one which minimizes the mean square error equation for every value of f, that is to say for the set of frequency bands. This relation can be written:

$$EQM(f)=R^2(f)+\overline{S^2_x(f)}W^4(f)H^2(f)-2R(f)\overline{S_x(f)}W^2(f)H(f). \qquad (6)$$

The operation of minimizing relation 6 (above) then makes it possible to write the transfer function of the optimal filter in the form of the relation:

$$H_{opt}(f) = \frac{R(f)\overline{S_x(f)}}{\overline{S^2_x(f)}} \frac{1}{W^2(f)} = Cons. \frac{1}{W^2(f)}. \qquad (7)$$

This relation clearly shows that the optimal filter compensates for the effect of the transmission channel.

Furthermore, regarding a reference signal RS as exhibiting a spectrum R(f) as having the same power as the digital telephone signal, then, the expression $E[R(f)S_x(f)]$ tends to be equal to $E[S^2_x(f)]$ and the optimal filter approaches the inverse of the transmission channel. Compensation is thus achieved.

In a particularly advantageous manner, it is indicated that the power of the reference signal RS can be modulated as a function of the power of the telephone speech signal. Such a modulation makes possible an improved operation of the blind equalization module as represented in FIG. 3a. Indeed, the power of the signal input varies according to the sound uttered, and does so at each instant. For fixed adaptation increments of the adaptation modules, the modules $30_i$ of FIG. 3a, the filter thus formed has a tendency to adapt in order to transform the most energetic sounds with a constant spectral density if the precaution of such a modulation is not taken. The adaptation increment can moreover vary as a function of the energy in the relevant frequency band.

A comparison of the aforesaid operating mode, according to the subject of the present invention, with a conventional high-pass or cepstral subtraction filtering mode shows that from the viewpoint of recognition performance, the operating mode, which is the subject of the present invention, is significantly superior with regard to certain databases than the procedures of the aforesaid state of the art, which of course validates and justifies the use of the process and system, which are the subjects of the present invention, for applications in automatic speech recognition.

The table below presents the improvements obtained as compared with a conventional technique, cepstral subtraction, by virtue of the proposed filtering procedure in accordance with the process and with the system which are the subjects of the present invention. It is indicated that the improvements in the last column of the aforesaid table are given in terms of reduction in error rate as compared with the reference version of a system developed in France by the Centre National d'Etudes des Télécommunications and designated as PHIL90. The bracket indicated beside the error rate for the basic system represents the 95% confidence interval. It will also be noted that cepstral subtraction, although it performs well, poses a problem of on-line setup in real time, since it is based on estimating the mean of the cepstral vectors during silence or over a broad speech horizon.

| Digits | Error rate | Reduction in error rate (improvement) |
|---|---|---|
| Basis system | 0.83% [0.58–1.18] | |
| Cepstral subtraction | 0.44% | 47% |
| Adaptive filtering | 0.41% | 51% |
| Trégor (name of the database) | Error rate | Reduction in error rate (improvement) |
| Basic system | 0.64% [0.52–0.79] | |
| Cepstral subtraction | 0.52% | 18% |
| Adaptive filtering | 0.54% | 16% |
| NB2 (base of 2-digit numbers 00–99) | Error rate | Reduction in error rate (improvement) |
| Basic system | 4.42% [3.97–4.92] | |
| Cepstral subtraction | 3.87% | 12% |
| Adaptive filtering | 3.75% | 15% |

An advantageous embodiment of the system of adaptive filtering of a digital telephone signal according to the subject of the present invention will now be described in conjunction with FIGS. 3b and 3c, by way of variant of the system described in conjunction with FIG. 3a.

In general, it is indicated, in conjunction with FIG. 3b, that the system, which is the subject of the present invention, comprises, apart from the circuits 1 and 2 for frequency transformation and sub-band filtering, a module for pre-processing calculation of the digital telephone signal s(n) and for calculating the energies output from the filter bank as well as the global energy for each window of the speech signal s(n). In FIG. 3b, these elements together bear the reference 1, 2 so as not to overload the drawing.

Furthermore, in the particular embodiment of FIG. 3b, the circuit 3 also includes a circuit, denoted 300, for calculating the logarithm or a power of the global energy calculated in the module 1,2 mentioned earlier. The aforesaid circuit 300 is followed by a circuit 301 for weighting the logarithm of the global energy, this weighting being performed as a function of the global energy of the digital telephone signal in order to produce a reference signal with constant spectral density.

In order to produce the reference signal RS, it is indicated that the system according to the invention, such as represented in FIG. 3b, can include a circuit for generating the specific digital signal SP starting from a database 303, this database being specific to the type of communication carried by the digital telephone signal. A modulator circuit 302 is provided, this modulator circuit making it possible to perform modulation of the reference signal with constant spectral density by the specific digital signal SP in order to produce a reference signal based on long-term statistics regarding the telephone signal. In a generic manner, the reference signal based on long-term statistics regarding the telephone signal also bears the reference RS.

As will be observed in FIG. 3b, each elementary signal $V_i$ is then submitted to an adaptive filtering processing by a corresponding adaptive filtering module $3_i$ starting from the reference signal RS, modulated or not by the database 303, each adaptive filtering module $3_i$ being represented and described in more detail in FIG. 3c.

As represented in the aforesaid figure, each adaptive filtering module comprises, apart from the attenuator circuit $30_i$ represented in FIG. 3a, receiving on the one hand the elementary signal or sub-band signal V(i) and on the other hand the adaptive attenuation value H(i), an adaptation module, denoted $31_i$, making it possible to deliver the aforesaid attenuation value H(i).

The adaptation module $31_i$ comprises, as represented in FIG. 3c, a subtractor circuit $310_i$ receiving on its positive input the reference signal RS and on its negative input the filtered sub-band signal $V_{n(i)}$ delivered by the attenuator circuit $30_i$. The subtractor circuit $310_i$ delivers the error signal Err(i). The adaptation module $31_i$ moreover includes a multiplier circuit $311_i$ receiving on a first input the elementary signal, or sub-band signal V(i), on a second input an adaptive filtering adaptation increment parameter, this parameter being denoted $\mu$ and on a third input the error signal Err(i) mentioned earlier. The adaptation module $31_i$ delivers an adaptation value to a circuit of integrator type formed by a summing unit $312_i$ and an element for delaying the digital telephone signal by a window duration, this delaying element bearing the reference $313_i$ and being looped back to an input of the summing circuit $312_i$. The output of the delaying element $313_i$ delivers the attenuation or filtering adaptive value H(i) cited previously to the attenuator circuit, or multiplier, $30_i$.

Finally, as represented in FIG. 3b, the system of adaptive filtering, which is the subject of the present invention, can include a circuit 4 for inverse frequency transformation receiving the filtered sub-band signals $V_n(1)$, $V_n(i)$ to $V_n(N)$ delivered by the adaptive filtering circuit 3, the circuit 4 for inverse frequency transformation thus delivering an equalized digital telephone signal, denoted s*(n) in which the channel component has been reduced through blind deconvolution.

A process and a system of adaptive filtering of a digital telephone signal have thus been described which are of particularly high performance in so far as, as compared with the prior techniques implementing cepstral subtraction, a significant improvement in filtering is thus obtained.

We claim:

1. A process for adaptive filtering of a digital telephone signal transmitted through telephone transmission lines and carrying a type of communication, said process comprising:

submitting said digital telephone signal to a FFT type frequency transformation so as to generate a FFT transformed digital signal;

submitting said FFT transformed digital signal to sub-band filtering so as to produce a plurality of sub-bands signals;

deriving a power signal based on the power of said digital telephone signal;

deriving a reference signal based on long-term statistics with respect to the digital telephone signal and modulated by said power signal and by a digital signal having spectral characteristics identical to the long-term spectral characteristics of speech stored in a database corresponding to the type of communication carried by said digital telephone signal; and submitting each of said sub-bands signal to adaptive filtering using said reference signal so as to identify and compensate for the contribution of said telephone transmission lines and to thus enable equalization by blind deconvolution of the effects of said telephone transmission lines on said digital telephone signal.

2. The process of claim 1, wherein said plurality of sub-band signals comprises a set of element signals V(i) or rank i and said adaptive filtering comprises submitting each of said elementary signals V(i) to least mean square adaptive filtering so as to generate corresponding filtered elementary signals $V_n(i)$, said adaptive filtering being based on an error criterion Err(i) for each elementary signal V(i) satisfying the relation Err(t)=R(i)−$V_n(i)$, wherein R(i) designates the reference signal for the corresponding elementary signal V(i).

3. The process of claim 1, wherein said reference signal comprises a signal with constant spectral density.

4. A system for adaptive filtering of a digital telephone signal transmitted through telephone transmission lines, said system comprising:

means for subjecting said digital telephone signal to a frequency transformation, by FFT processing, so as to produce an FFT transformed digital signal and for subjecting said FFT transformed signal to a sub-band filtering so as to produce a plurality of sub-band signals;

means for generating a reference signal based on long-term statistics regarding said digital telephone signal, said means for generating a reference signal including means for calculating the global energy of the digital telephone signal and the logarithm of said energy, and means for weighing the logarithm of said energy, as a function of the global energy of the digital telephone signal, so as to produce a signal having a constant spectral density on which said reference signal is based; and means for providing adaptive filtering of each of said sub-band signals using said reference signal so as to produce filtered sub-band signals, and to thus enable equalization by blind deconvolution of the effects of said telephone transmission lines on said digital telephone signal.

5. The system of claim 4, wherein the digital telephone signal carries a type of communication and said means for generating a reference signal further includes:

a generator for generating a further digital signal having spectral characteristics substantially identical to the long-term spectral characteristics of speech stored in a database corresponding to the type of communication carried by the digital telephone signal; and a circuit for modulating said reference signal having a constant spectral density with said further digital signal so as to produce said reference signal based on long-term statistics regarding the telephone signal.

6. The system of claim 4 wherein said adaptive filtering means comprises, for each sub-band signal:

a subtractor circuit for receiving, on a positive input, said reference signal and for receiving, on a negative input, a corresponding one of said filtered sub-band signals, and for producing an error signal;

a multiplier circuit for receiving, on a first input, said one sub-band signal, for receiving, on a second input, an adaptation increment parameter of the adaptive filtering means, and for receiving, on a third input, said error signal, and for producing an adaptation value;

an integrator circuit for receiving said adaptation value and producing an output signal related to the value of an adaptive filtering coefficient; and a multiplier circuit for receiving, on a first input, a corresponding one of said sub-band signals and for receiving, on a second input, said output signal related to said value of adaptive filtering coefficient, and for producing a said-filtered sub-band signal.

7. The system of claim 4 further including inverse frequency transformation means for receiving said filtered sub-band signals and for producing an equalized digital telephone signal wherein the contribution of the transmission lines is reduced by blind deconvolution.

8. A system for adaptive filtering of a digital telephone signal transmitted through telephone transmission lines, said system comprising:

means for subjecting said digital telephone signal to a frequency transformation, by FFT processing, so as to produce an FFT transformed digital signal and for subjecting said FFT transformed signal to a sub-band filtering so as to produce a plurality of sub-band signals;

means for generating a reference signal based on long-term statistics regarding said digital telephone signal, said means for generating a reference signal including means for calculating the global energy of the digital telephone signal and a power of said energy, and means for weighing the power of said energy, as a function of the global energy of the digital telephone signal, so as to produce a signal having a constant spectral density on which said reference signal is based; and means for providing adaptive filtering of each of said sub-band signals using said reference signal so as to produce filtered sub-band signals, and to thus enable equalization by blind deconvolution of the effects of said telephone transmission lines on said digital telephone signal.

9. The system of claim 8, wherein the digital telephone signal carries a type of communication and said means for generating a reference signal further includes:

a generator for generating a further digital signal having spectral characteristics identical to the long-term spectral characteristics of speech stored in a database corresponding to the type of communication carried by the digital telephone signal; and a circuit for modulating said reference signal having a constant spectral density with said further digital signal so as to produce said reference signal based on long-term statistics regarding the telephone signal.

10. The system of claim 8 wherein said filtering means comprises, for each sub-band signal:

a subtractor circuit for receiving, on a positive input, said reference signal and for receiving, on a negative input, a corresponding one of said filtered sub-band signals, and for producing an error signal;

a multiplier circuit for receiving, on a first input, said one sub-band signal, for receiving, on a second input, an adaption increment parameter of the adaptive filtering means, and for receiving, on a third input, said error signal, and for producing an adaptation value;

an integrator circuit for receiving said adaptation value and producing an output signal related to the value of an adaptive filtering coefficient; and a multiplier circuit for receiving, on a first input, a corresponding one of said sub-band signals and for receiving, on a second input, said output signal related to said value of adaptive filtering coefficient, and for producing a said-filtered sub-band signal.

11. The system of claim 8 further including inverse frequency transformation means for receiving said filtered sub-band signals and for producing an equalized digital telephone signal wherein the contribution of the transmission lines is reduced by blind deconvolution.

* * * * *